United States Patent
Chang

(10) Patent No.: US 8,013,936 B2
(45) Date of Patent: Sep. 6, 2011

(54) DE-INTERLACING METHOD AND APPARATUS

(75) Inventor: Fang-Chen Chang, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1107 days.

(21) Appl. No.: 11/819,062

(22) Filed: Jun. 25, 2007

(65) Prior Publication Data

US 2008/0074538 A1 Mar. 27, 2008

(30) Foreign Application Priority Data

Sep. 26, 2006 (TW) .............................. 95135617 A

(51) Int. Cl.
*H04N 7/01* (2006.01)
(52) U.S. Cl. ...................................... 348/448
(58) Field of Classification Search .................. 348/448, 348/441, 458, 459, 607; 382/299, 300, 190, 382/199, 167
See application file for complete search history.

(56) References Cited

U.S. PATENT DOCUMENTS

| | | | |
|---|---|---|---|
| 7,126,643 B2 * | 10/2006 | Song et al. | 348/448 |
| 7,190,406 B2 * | 3/2007 | Ji et al. | 348/448 |
| 7,460,734 B2 * | 12/2008 | Chao | 382/300 |
| 7,835,573 B2 * | 11/2010 | Kang et al. | 382/167 |
| 7,876,979 B2 * | 1/2011 | Lee et al. | 382/300 |
| 2004/0135926 A1 | 7/2004 | Song et al. | |

* cited by examiner

*Primary Examiner* — Paulos M Natnael
(74) *Attorney, Agent, or Firm* — Rabin & Berdo, P.C.

(57) ABSTRACT

A de-interlacing method is applied to a to-be-de-interlaced field including display pixels of display lines and to-be-interpolated pixels of to-be-interpolated lines. First, a corresponding edge-direction value of each of edge pixels in the to-be-de-interlaced field is determined. Next, it is judged whether one of the display pixels near each to-be-interpolated pixel has a corresponding edge-direction value so that a judgement result is obtained. Then, a corresponding edge-direction value of each to-be-interpolated pixel is set according to the corresponding edge-direction values of specific display pixels of the display pixels near the to-be-interpolated pixel if the judgement result is affirmative. Finally, a corresponding display pixel pair of up and down display lines near each to-be-interpolated pixel is selected according to the corresponding edge-direction value of each to-be-interpolated pixel so that a luminance value and a chrominance value of the to-be-interpolated pixel are calculated.

12 Claims, 4 Drawing Sheets

DE-INTERLACING METHOD AND APPARATUS

This application claims the benefit of Taiwan application Serial No. 95135617, filed Sep. 26, 2006, the subject matter of which is incorporated herein by reference.

BACKGROUND OF THE INVENTION

1. Field of the Invention

The invention relates in general to a de-interlacing method and a de-interlacing apparatus, and more particularly to a de-interlacing method and a de-interlacing apparatus using a direction map.

2. Description of the Related Art

The typical video is played in an interlaced manner. When each frame is being displayed, an odd field is first displayed, and then an even field is displayed. The odd field is composed of odd display lines of the frame, while the even field is composed of even display lines of the frame.

However, the more advanced image playing device, such as a high definition television (HDTV), supports the non-interlaced display. Thus, a de-interlacing method is required to de-interlace the fields, which are displayed in the interlaced manner, into a complete frame, and then to display the frame. The typical de-interlacing method, such as an edge-based line averaging, determines a best edge direction for the to-be-interpolated pixel and thus selects the corresponding pixel pair in the display lines above and under the to-be-interpolated pixel so as to calculate the luminance value and the chrominance value of the to-be-interpolated pixel. The best edge direction is determined according to the luminance difference of the corresponding pixel pair in each possible edge direction.

However, this edge base line average method is not perfect because determining the best edge direction according to the luminance difference of the corresponding pixel pair may have errors.

SUMMARY OF THE INVENTION

The invention is directed to a de-interlacing method and a de-interlacing apparatus. An edge-direction value of a to-be-interpolated pixel is calculated according to edge-direction values of specific display pixels near the to-be-interpolated pixel, and a corresponding display pixel pair is selected in the display lines above and under the to-be-interpolated pixel according to a corresponding edge direction so that a luminance value and a chrominance value can be obtained by way of interpolation. Thus, the required calculation can be reduced, and the correctness of each of the interpolated luminance value and the interpolated chrominance value can be greatly enhanced.

According to a first aspect of the present invention, a de-interlaced method applied to a to-be-de-interlaced field is provided. The to-be-de-interlaced field includes a number of display pixels of display lines and a number of to-be-interpolated pixels of to-be-interpolated lines. First, an edge-direction value corresponding to each of edge pixels in the to-be-de-interlaced field is determined. Next, it is judged whether one of the display pixels near each of the to-be-interpolated pixels has a corresponding edge-direction value to obtain a judgement result. Then, a corresponding edge-direction value for each of the to-be-interpolated pixels is set according to the corresponding edge-direction values of specific display pixels near each of the to-be-interpolated pixels if the judgement result is affirmative. Finally, a corresponding display pixel pair is selected in the display lines above and under each of the to-be-interpolated pixels according to the corresponding edge-direction value of the to-be-interpolated pixel so as to calculate a luminance value and a chrominance value for each of the to-be-interpolated pixels.

According to a second aspect of the present invention, a de-interlacing apparatus for a to-be-de-interlaced field is provided. The to-be-de-interlaced field includes a number of display pixels of display lines and a number of to-be-interpolated pixels of to-be-interpolated lines. The de-interlacing apparatus includes an edge pixel determining unit, an edge-direction value determining unit and a calculating unit. The edge pixel determining unit determines an edge-direction value corresponding to each of edge pixels in the to-be-de-interlaced field. The edge-direction value determining unit judges whether one of the display pixels near each of the to-be-interpolated pixels has a corresponding edge-direction value, and sets a corresponding edge-direction value of each of the to-be-interpolated pixels according to the corresponding edge-direction values of specific display pixels of the display pixels near each of the to-be-interpolated pixels. The calculating unit selects a corresponding display pixel pair in the display lines above and under each of the to-be-interpolated pixels according to the corresponding edge-direction value of each of the to-be-interpolated pixels so as to calculate a luminance value and a chrominance value of the to-be-interpolated pixel.

The invention will become apparent from the following detailed description of the preferred but non-limiting embodiment. The following description is made with reference to the accompanying drawings.

DETAILED DESCRIPTION OF THE INVENTION

Figure 1A:
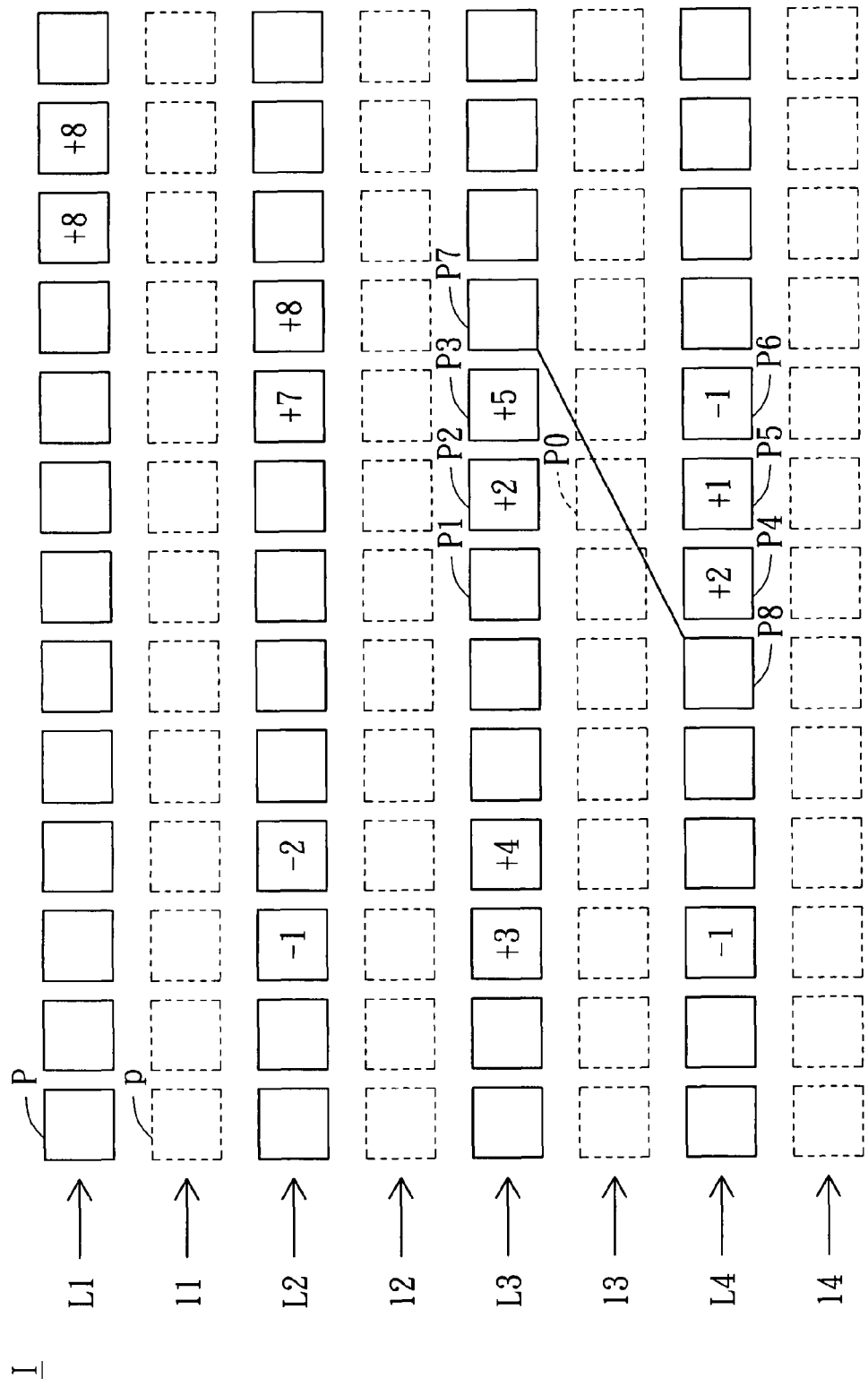
FIG. 1A is a partial schematic illustration showing a to-be-de-interlaced field I according to a preferred embodiment of the invention.
Figure 1B:
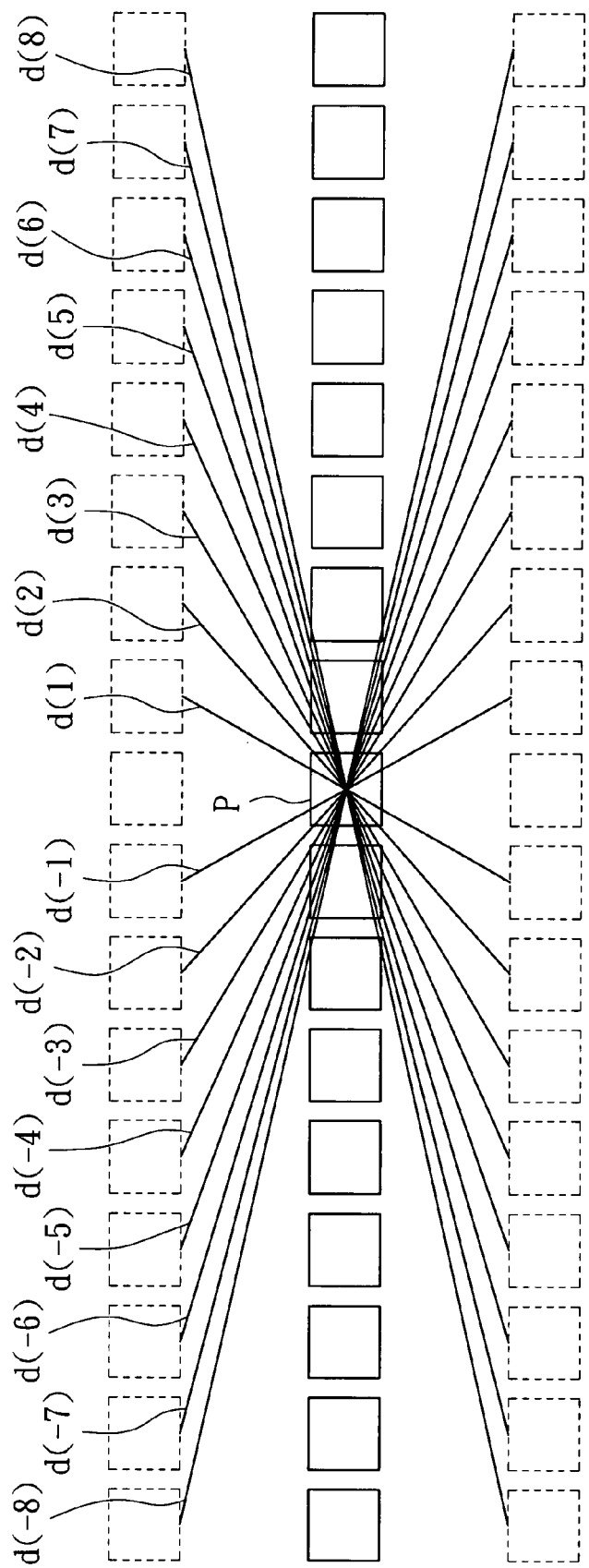
FIG. 1B is a schematic illustration showing an edge direction d(i) corresponding to each edge-direction value i.

FIG. 1A is a partial schematic illustration showing a to-be-de-interlaced field I according to a preferred embodiment of the invention. FIG. 1B is a schematic illustration showing an edge direction d(i) corresponding to each edge-direction value i. The to-be-de-interlaced field I, such as the odd field, includes several display lines L1 to L4 and several to-be-interpolated lines I1 to I4. Each display pixel P of each display line is represented by a solid-line frame. Each to-be-interpolated pixel p of each to-be-interpolated line is represented by a dashed-line frame. In addition, some display pixels P have edge-direction values, such as the values labeled in the solid-line frame of FIG. 1A.

In the preferred embodiment of the invention, the edge-direction value may be obtained by using various edge detection algorithms, such as the Sobel, Canny or Prewitt type edge detection algorithm, to obtain the edge pixel of the to-be-de-interlaced field I and then further analyzing the relationship between the edge pixel and its neighboring pixels. In the preferred embodiment of the invention, the position of the edge pixel of the to-be-de-interlaced field I is recorded in a corresponding edge map, and the edge-direction value of the to-be-de-interlaced field is recorded in a corresponding direction map.

As shown in FIG. 1B, the edge-direction value with the positive integer represents a right-down edge direction, and the edge-direction value with the negative integer represents a left-down edge direction in the preferred embodiment of the invention. That is, when the pixel P has the edge-direction value i, the edge direction of the pixel P corresponds to the slant line d(i) shown in FIG. 1B, wherein i=1 to 8 or −1 to −8.

The way of calculating a luminance value and a chrominance value of the to-be-interpolated pixel p0 of FIG. 1A by way of interpolation will be described in the following.

Figure 2:
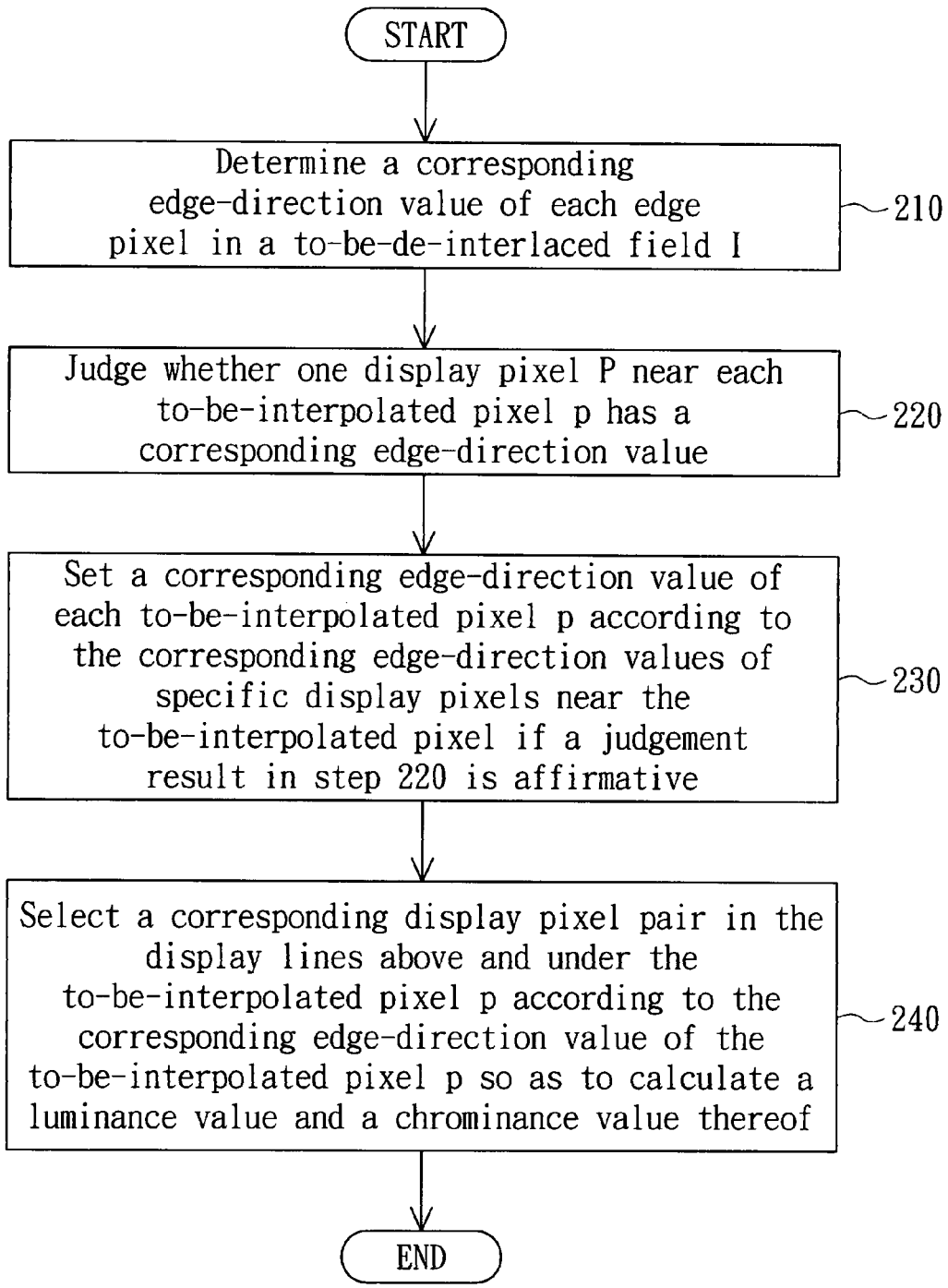
FIG. 2 is a flow chart showing a de-interlacing method according to the preferred embodiment of the invention.

FIG. 2 is a flow chart showing a de-interlacing method according to the preferred embodiment of the invention. As shown in FIG. 2, the method starts from the step 210 to determine a corresponding edge-direction value of each of edge pixels in the to-be-de-interlaced field I. As mentioned hereinabove, the values labeled in the solid-line frames of FIG. 1A can be obtained.

Next, in step 220, judge whether one of the display pixels P near the to-be-interpolated pixel p has a corresponding edge-direction value. In the embodiment of the invention, the display pixels near the to-be-interpolated pixel p0 include a left-up display pixel P1, an up display pixel P2, a right-up display pixel P3, a left-down display pixel P4, a down display pixel P5 and a right-down display pixel P6. In step 220, it is possible to judge whether the six display pixels have the edge-direction values according to a corresponding direction map of the to-be-de-interlaced field I.

As shown in FIG. 1A, the up display pixel P2, the right-up display pixel P3, the left-down display pixel P4 and the down display pixel P5 respectively have the edge-direction values +2, +5, +2 and +1, the right-down display pixel P6 has the edge-direction value −1, while the left-up display pixel P1 has no edge-direction value.

Then, in step 230, if the judgement result of step 220 is affirmative, set a corresponding edge-direction value of each to-be-interpolated pixel p according to the corresponding edge-direction values of the specific display pixels P near the to-be-interpolated pixel p. In this preferred embodiment of the invention, step 230 may further include the following sub-steps.

First, count the number of the display pixels corresponding to the left-down edge direction and the number of the display pixels corresponding to the right-down edge direction among the display pixels P near the to-be-interpolated pixel p. Taking FIG. 1A as an example, only the edge-direction value −1 of the right-down display pixel P6 corresponds to the left-down edge direction, while the edge-direction values of the up display pixel P2, the right-up display pixel P3, the left-down display pixel P4 and the down display pixel P5 correspond to the right-down edge direction among the display pixels P1 to P6. That is, the number of the display pixels corresponding to the left-down edge direction is smaller than the number of the display pixels corresponding to the right-down edge direction.

Next, when the number of the display pixels corresponding to the left-down edge direction is greater than the number of the display pixels corresponding to the right-down edge direction, set the substantial edge direction of the to-be-interpolated pixel p as the left-down edge direction, discard the display pixel of the corresponding right-down edge direction, and calculate the edge-direction value of the to-be-interpolated pixel p only according to the edge-direction values of the display pixels corresponding to the left-down edge direction. When the number of the display pixels corresponding to the left-down edge direction is smaller than the number of the display pixels corresponding to the right-down edge direction, set the substantial edge direction of the to-be-interpolated pixel p as the right-down edge direction, discard the display pixel corresponding to the left-down edge direction, and calculate the edge-direction value of the to-be-interpolated pixel p only according to the edge-direction values of the display pixels corresponding to the right-down edge direction.

Taking the to-be-interpolated pixel p0 of FIG. 1A as an example, after the counted number of the display pixels corresponding to the left-down edge direction is smaller than the number of the display pixels corresponding to the right-down edge direction, the substantial edge direction of the to-be-interpolated pixel p0 may be set as the right-down edge direction, the right-down display pixel P6 corresponding to the left-down edge direction is discarded, and the edge-direction value of the to-be-interpolated pixel p0 is calculated only according to the edge-direction values +2, +5, +2 and +1 of the up display pixel P2, the right-up display pixel P3, the left-down display pixel P4 and the down display pixel P5 corresponding to the right-down edge direction. For example, the edge-direction value of the to-be-interpolated pixel p0 may be set as an average pixel direction value of the display pixels corresponding to the right-down edge direction, that is, (2+5+2+1)/4=2.5.

Finally, in step 240, select a corresponding display pixel pair in the display lines above and under each to-be-interpolated pixel according to the corresponding edge-direction value of each the to-be-interpolated pixel p so that the luminance value and the chrominance value of each to-be-interpolated pixel p may be calculated. In the preferred embodiment of the invention, the value 2.5 obtained in step 230 represents the edge direction of the to-be-interpolated pixel p0. As shown in FIG. 1B, the edge direction 2.5 may be regarded as ranging between d(2) and d(3), and d(2) with the greater slope or d(3) with the smaller slope may be selected as the corresponding edge direction. Taking the d(2) with the greater slope as the corresponding edge direction as an example, the luminance value of the to-be-interpolated pixel p can be calculated according to the luminance values of two display pixels P in the display lines above and under the to-be-interpolated pixel p corresponding to the edge direction d(2) of the to-be-interpolated pixel p.

In the preferred embodiment of the invention, two display pixels of the display lines L3 and L4 above and under the to-be-interpolated pixel p0 corresponding to the edge direction d(2) are the display pixels P7 and P8 in FIG. 1A. Thus, the luminance values of the display pixels P7 and P8 may be averaged to obtain the luminance value of the to-be-interpolated pixel p0 according to the edge-based line averaging. Similarly, the chrominance value of the to-be-interpolated pixel p0 may also be obtained by averaging the chrominance values of the display pixels P7 and P8.

In addition, in step 220, if it is judged that the display pixels P0 to P6 do not have the edge-direction value, then the luminance value and the chrominance value of the to-be-interpolated pixel p0 may be calculated by way of line averaging or intra-field interpolation, for example. Furthermore, if the number of the display pixels corresponding to the left-down edge direction is equal to the number of the display pixels corresponding to the right-down edge direction in step 230, a consistency degree of the edge-direction values of the display pixels P corresponding to the left-down edge direction may be compared with a consistency degree of the edge-direction values of the display pixels P corresponding to the right-down edge direction, and the edge-direction value of the to-beinterpolated pixel p may be set according to the edge-direction values of the display pixels with the higher consistency degree.

For example, it is assumed that three display pixels among the display pixels P1 to P6 have the edge-direction values +2, +2 and +2, and the other three display pixels have the edge-direction values −1, −3 and −4. In this case, it is obtained that the edge-direction values corresponding to the right-down edge direction have the higher consistency degree, so the substantial edge direction of the to-be-interpolated pixel p0 may be set as the right-down edge direction with the higher consistency degree. Next, the average edge-direction value (2+2+2)/3=2 of the display pixels with the higher consistency degree may serve as the edge-direction value of the to-be-interpolated pixel p0 so that step 240 can be performed. Of course, the definition of the consistency degree may vary according to the hardware ability or other considerations. When the consistency degrees are the same, the edge direction of the to-be-interpolated pixel p0 is set as the vertical direction, and then the luminance value and the chrominance value of the to-be-interpolated pixel p0 may obtained by averaging the luminance values and the chrominance values of the display pixels P2 and P5, respectively.

Figure 3:
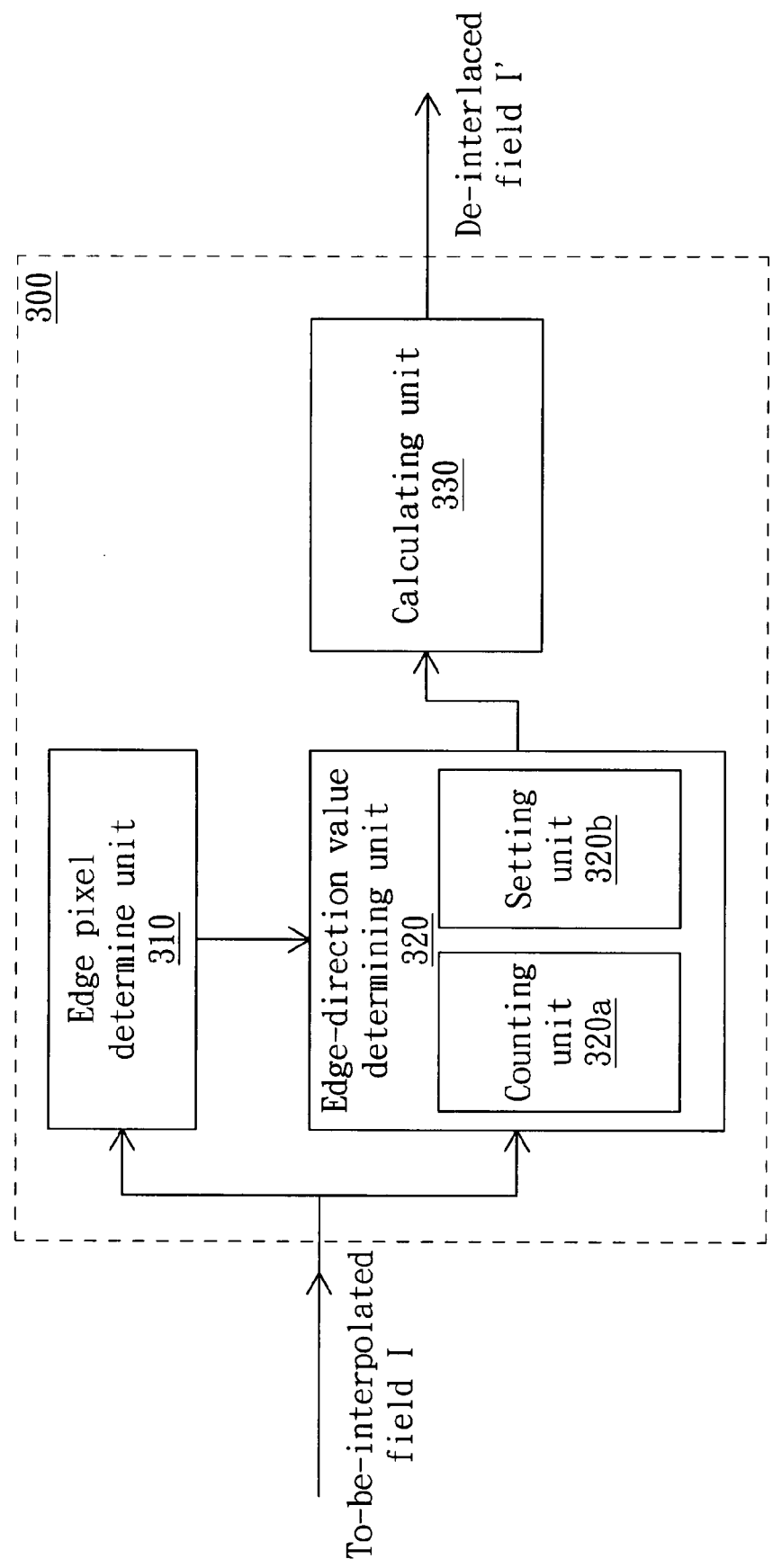
FIG. 3 is a block diagram showing a de-interlacing apparatus according to the preferred embodiment of the invention.

FIG. 3 is a block diagram showing a de-interlacing apparatus 300 according to the preferred embodiment of the invention. Referring to FIG. 3, the de-interlacing apparatus 300 includes an edge pixel determining unit 310, an edge-direction value determining unit 320 and a calculating unit 330. The edge pixel determining unit 310 judges a position of each edge pixel in the to-be-de-interlaced field I using various edge detection algorithms, such as the Sobel, Canny or Prewitt edge detection algorithm, and further analyzes the relationship between the edge pixel and its neighboring pixels to determine the corresponding edge-direction value of the edge pixel and thus to output the corresponding direction map.

The edge-direction value determining unit 320 judges whether any one of the display pixels P near the to-be-interpolated pixel p has a corresponding edge-direction value according to an output result of the edge pixel determining unit 310, and sets a corresponding edge-direction value of the to-be-interpolated pixel p according to the corresponding edge-direction values of the specific display pixels P near the to-be-interpolated pixel p.

The calculating unit 330 predicts the substantial edge direction of the to-be-interpolated pixel p according to the corresponding edge-direction value of the to-be-interpolated pixel p so as to select the corresponding display pixel pair in the display lines above and under the to-be-interpolated pixel p corresponding to the substantial edge direction, and thus to calculate the luminance value and the chrominance value of the to-be-interpolated pixel p. For example, the luminance value and the chrominance value of the to-be-interpolated pixel p are obtained according to the luminance values and the chrominance values of the corresponding display pixel pair, respectively, by way of averaging or other interpolation methods.

In addition, in the preferred embodiment of the invention, the edge-direction value determining unit 320 further includes a counting unit 320a and a setting unit 320b. The counting unit 320a counts the number of the display pixels corresponding to the left-down edge direction and the number of the display pixels corresponding to the right-down edge direction, and determines the substantial edge direction of the to-be-interpolated pixel p according to the number relationship therebetween and the consistency degree thereof (if necessary). The setting unit 320b sets the edge-direction value of the to-be-interpolated pixel p according to the counted result of the counting unit 320a, as shown in step 230. In addition, if the edge-direction value determining unit 320 judges that the neighboring display pixels P have no edge-direction value, then the calculating unit 330 may also perform the conventional line average method or the conventional intra-field interpolation to calculate the luminance value and the chrominance value of the to-be-interpolated pixel p. Consequently, the to-be-de-interlaced field I may be converted into a complete de-interlaced frame I' to be displayed in a non-interlaced manner after the interpolating operation of the de-interlacing apparatus 300 is performed.

However, one of ordinary skill in the art may also understand that the technology of the invention is not limited to the preferred embodiment. First, the value representation of the edge-direction value and the corresponding manner of the edge direction are not restricted to those shown in FIG. 1B, and may be adjusted according to the methods of producing the edge map and the direction map. In addition, the number of the display pixels near the to-be-interpolated pixel may also be processed by taking four display pixels from two display lines above the to-be-interpolated pixel and two down display lines under the to-be-interpolated pixel.

In the de-interlacing method and apparatus according to the embodiment of the invention, the edge-direction value of the to-be-interpolated pixel is calculated according to the edge-direction values of the specific display pixels near the to-be-interpolated pixel, and the corresponding display pixel pair in the display lines above and under the to-be-interpolated pixel is selected according to the corresponding edge direction so that the luminance value and the chrominance value can be obtained by way of interpolation. Thus, the required calculation can be reduced, and the correctness of each of the interpolated luminance value and the interpolated chrominance value can be greatly enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A de-interlacing method applied to a to-be-de-interlaced field, which comprises a plurality of display pixels of display lines and a plurality of to-be-interpolated pixels of to-be-interpolated lines, the method comprising the steps of:
   (a) determining an edge-direction value corresponding to each of edge pixels in the to-be-de-interlaced field;
   (b) judging whether one of the display pixels near each of the to-be-interpolated pixels has a corresponding edge-direction value to obtain a judgement result;
   (c) setting the corresponding edge-direction value for each of the to-be-interpolated pixels according to the corresponding edge-direction values of specific display pixels near each of the to-be-interpolated pixels if the judgement result in step (b) is affirmative; and
   (d) selecting a corresponding display pixel pair from the display lines above and under each of the to-be-interpolated pixels according to the corresponding edge-direction value of each of the to-be-interpolated pixels so as to calculate a luminance value and a chrominance value of each of the to-be-interpolated pixels.

2. The method according to claim 1, wherein the step (c) comprises:
   (c1) counting the number of the display pixels corresponding to a left-down edge direction and the number of the display pixels corresponding to a right-down edge direction among the display pixels near each of the to-be-interpolated pixels;

(c2) setting an average edge-direction value of the display pixels corresponding to the left-down edge direction as the corresponding edge-direction value of each of the to-be-interpolated pixels when the number of the display pixels corresponding to the left-down edge direction is greater than the number of the display pixels corresponding to the right-down edge direction; and (c3) setting an average edge-direction value of the display pixels corresponding to the right-down edge direction as the corresponding edge-direction value of each of the to-be-interpolated pixels when the number of the display pixels corresponding to the left-down edge direction is smaller than the number of the display pixels corresponding to the right-down edge direction.

3. The method according to claim 2, wherein in the step (c1), the edge-direction value corresponding to the right-down edge direction is a positive integer, and the edge-direction value corresponding to the left-down edge direction is a negative integer.

4. The method according to claim 2, after the step (c1), further comprising, the step of:

(c4) comparing a consistency degree of the corresponding edge-direction values of the display pixels corresponding to the left-down edge direction with a consistency degree of the corresponding edge-direction values of the display pixels corresponding to the right-down edge direction, and setting an average edge-direction value of the display pixels with the higher consistency degree as the corresponding edge-direction value of the to-be-interpolated pixel when the number of the display pixels corresponding to the left-down edge direction is equal to the number of the display pixels corresponding to the right-down edge direction.

5. The method according to claim 4, wherein the step (c4) further comprises:

setting the corresponding edge direction of the to-be-interpolated pixel as a vertical direction when the consistency degree of the corresponding edge-direction values of the display pixels corresponding to the left-down edge direction is the same as the consistency degree of the corresponding edge-direction values of the display pixels corresponding to the right-down edge direction.

6. The method according to claim 1, further comprising, after the step (b), the step of:

(e) calculating the luminance value and the chrominance value of each of the to-be-interpolated pixels by way of line averaging or intra-field interpolation when all the display pixels near each of the to-be-interpolated pixels do not have the corresponding edge-direction value.

7. A de-interlacing apparatus for a to-be-de-interlaced field, which comprises a plurality of display pixels of display lines and a plurality of to-be-interpolated pixels of to-be-interpolated lines, the apparatus comprising:

an edge pixel determining unit for determining an edge-direction value corresponding to each of edge pixels in the to-be-de-interlaced field;

an edge-direction value determining unit for judging whether one of the display pixels near each of the to-be-interpolated pixels has a corresponding edge-direction value, and setting the corresponding edge-direction value for each of the to-be-interpolated pixels according to the corresponding edge-direction values of specific display pixels of the display pixels near the each of the to-be-interpolated pixels; and a calculating unit for selecting a corresponding display pixel pair from the display lines above and under each of the to-be-interpolated pixels according to the corresponding edge-direction value of each of the to-be-interpolated pixels so as to calculate a luminance value and a chrominance value of each of the to-be-interpolated pixels.

8. The apparatus according to claim 7, wherein the edge-direction value determining unit comprises:

a counting unit for counting the number of the display pixels corresponding to a left-down edge direction and the number of the display pixels corresponding to a right-down edge direction among the display pixels near each of the to-be-interpolated pixels; and a setting unit for setting an average edge-direction value of the display pixels corresponding to the left-down edge direction as the corresponding edge-direction value of each of the to-be-interpolated pixels when the number of the display pixels corresponding to the left-down edge direction is greater than the number of the display pixels corresponding to the right-down edge direction, and setting an average edge-direction value of the display pixels corresponding to the right-down edge direction as the corresponding edge-direction value of each of the to-be-interpolated pixels when the number of the display pixels corresponding to the left-down edge direction is smaller than the number of the display pixels corresponding to the right-down edge direction.

9. The apparatus according to claim 8, wherein the edge-direction value corresponding to the right-down edge direction is a positive integer, and the edge-direction value corresponding to the left-down edge direction is a negative integer.

10. The apparatus according to claim 8, wherein the setting unit further compares a consistency degree of the corresponding edge-direction values of the display pixels corresponding to the left-down edge direction with a consistency degree of the corresponding edge-direction values of the display pixels corresponding to the right-down edge direction, and setting an average edge-direction value of the display pixels with the higher consistency degree as the corresponding edge-direction value of the to-be-interpolated pixel when the number of the display pixels corresponding to the left-down edge direction is equal to the number of the display pixels corresponding to the right-down edge direction.

11. The apparatus according to claim 10, wherein the setting unit further sets the corresponding edge direction of the to-be-interpolated pixel as a vertical direction when the consistency degree of the corresponding edge-direction values of the display pixels corresponding to the left-down edge direction is the same as the consistency degree of the corresponding edge-direction values of the display pixels corresponding to the right-down edge direction.

12. The apparatus according to claim 7, wherein the calculating unit calculates the luminance value and the chrominance value of each of the to-be-interpolated pixels by way of line averaging or intra-field interpolation when all the display pixels near each of the to-be-interpolated pixels do not have the corresponding edge-direction value.

* * * * *